United States Patent [19]

Crane

[11] Patent Number: 5,142,793
[45] Date of Patent: * Sep. 1, 1992

[54] DIGITAL LINEAR MEASURING DEVICE

[75] Inventor: R. Stephen Crane, Annapolis, Md.

[73] Assignee: Contek Corporation, Oklahoma City, Okla.

[*] Notice: The portion of the term of this patent subsequent to Jul. 2, 2008 has been disclaimed.

[21] Appl. No.: 679,227

[22] Filed: Apr. 2, 1991

Related U.S. Application Data

[63] Continuation of Ser. No. 360,837, Jun. 2, 1989, Pat. No. 5,027,526.

[51] Int. Cl.⁵ .......................... G01B 3/10; G01D 5/34
[52] U.S. Cl. ......................................... 33/763; 33/755; 377/24
[58] Field of Search .................. 33/755, 761, 763, 766, 33/767, 760; 200/11 TW; 377/24

[56] References Cited

U.S. PATENT DOCUMENTS

| | | | |
|---|---|---|---|
| 3,366,751 | 1/1968 | Capellari | 200/11 TW |
| 4,143,267 | 3/1979 | Johnson et al. | 33/755 |
| 4,164,816 | 8/1979 | Berqkvist | 33/762 |
| 4,178,691 | 12/1979 | Tateishi | 33/762 |
| 4,181,960 | 1/1980 | Tateishi et al. | |
| 4,185,390 | 1/1980 | Tateishi | |
| 4,242,574 | 12/1980 | Grant | |
| 4,316,081 | 2/1982 | Washizuka et al. | |
| 4,366,623 | 1/1983 | Bergqvist | |
| 4,395,630 | 7/1983 | Ramsden et al. | |
| 4,483,077 | 11/1984 | Matsumoto et al. | 33/755 |
| 4,535,415 | 8/1985 | Hird | |
| 4,547,969 | 10/1985 | Haack | |
| 4,551,847 | 11/1985 | Caldwell | 33/755 |
| 4,575,944 | 3/1986 | Lin | 33/762 |
| 4,587,738 | 5/1986 | Kang | |
| 4,611,402 | 9/1986 | Yamamoto et al. | |
| 4,642,899 | 2/1987 | Fass et al. | |
| 4,658,134 | 4/1987 | Okumura | |
| 4,747,215 | 5/1988 | Waikas | |
| 4,765,063 | 8/1988 | Sing | |
| 4,896,280 | 1/1990 | Phillips | 33/759 |
| 5,027,526 | 7/1991 | Crane | 33/763 |

Primary Examiner—William A. Cuchlinski, Jr.
Assistant Examiner—C. W. Fulton
Attorney, Agent, or Firm—Pollock, Vande Sande & Priddy

[57] ABSTRACT

A digital linear measuring device includes a housing, a reel located within a housing and a measuring tape wound on the reel. The measuring tape is extendable through an opening in the housing as the reel is rotated. An incremental measuring means is associated with the reel for generating incremental measuring data and an absolute measuring means cooperates with the measuring tape for generating absolute measurement data as the measuring tape is extended. A processing unit is responsive to both the incremental measurement data and to the absolute measurement data for generating output reflecting linear extension of the measuring tape from the housing, and a display is responsive to the processing unit for displaying information reflecting the linear extension of the measuring tape from the housing.

6 Claims, 9 Drawing Sheets

| TWO OF FIVE CODE ||
| CHARACTER | CODE |
|---|---|
| 0 | 00110 |
| 1 | 10001 |
| 2 | 01001 |
| 3 | 11000 |
| 4 | 00101 |
| 5 | 10100 |
| 6 | 01100 |
| 7 | 00011 |
| 8 | 10010 |
| 9 | 01010 |
| START | 110 |
| STOP | 101 |

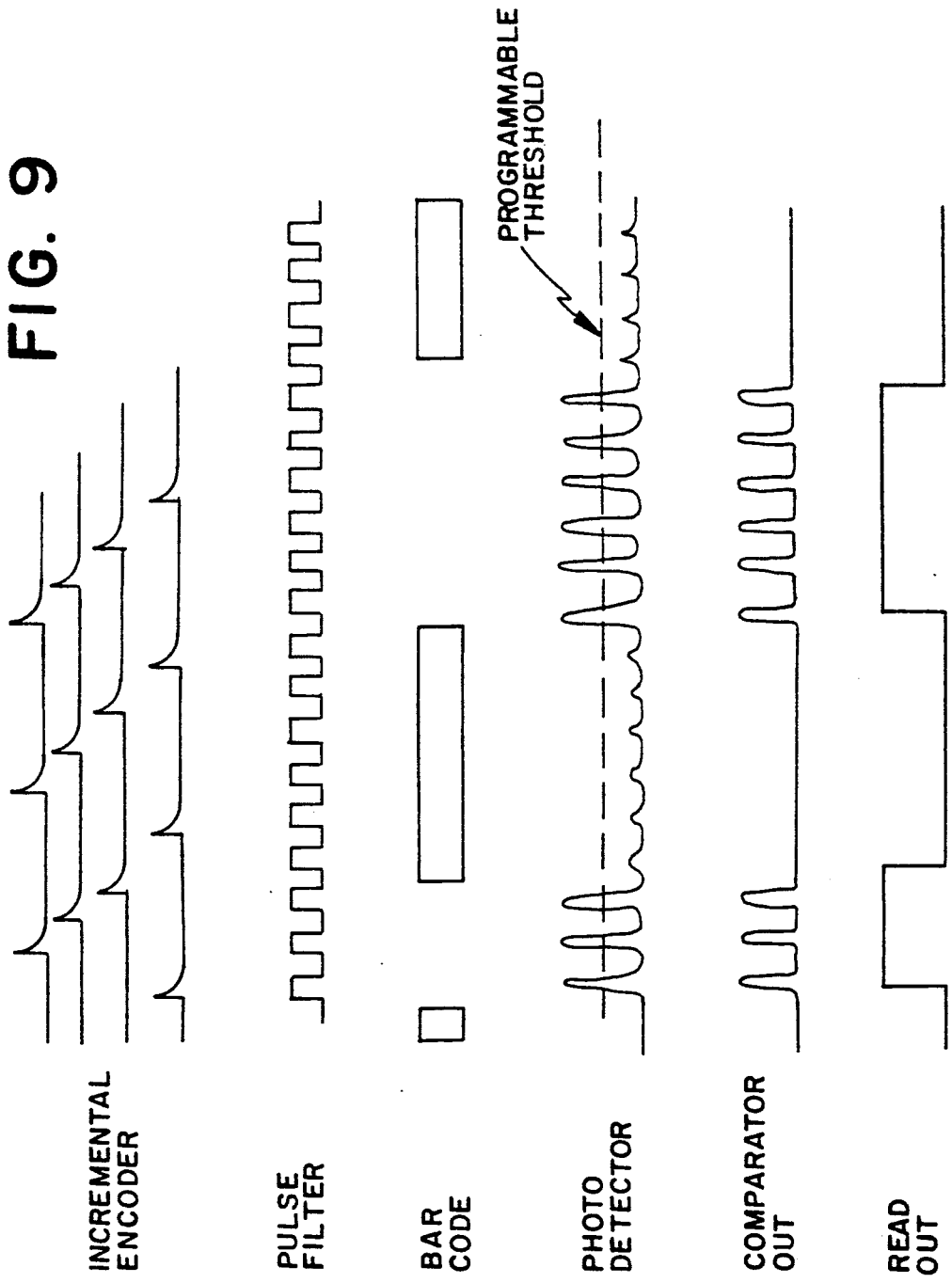

DIGITAL LINEAR MEASURING DEVICE

This is a continuation of Ser. No. 07/360,837, filed on Jun. 2, 1989 now U.S. Pat. No. 5,027,526.

FIELD OF THE INVENTION

The present invention relates to electronic linear tape measures, and more particularly, to an electronic tape measure which provides a direct digital display of the length measured by the tape.

BACKGROUND OF THE INVENTION

Electronic tape measures have been known and available for a number of years. In many such devices, the length measured is determined by mechanically or optically tracking the length of a tape unwound from a rotating take-up reel located within the case. The tape measure has means associated with the rotating take-up reel to cause the generation of a number of electrical pulses corresponding to the length of the extended tape. These pulses are counted and converted to visual form for display.

The counting function may be implemented in the form of an encoder. Such an encoder may be provided on the take-up reel in the form of, for example, mechanical contacts defining multiple rotary switches coupled to the motion of the take-up reel.

The measuring devices of the above described type, although relatively simple in structure and capable of providing measurement reading at precise intervals, tend to be unreliable and inaccurate due to mechanical shock resulting in missed or spurious pulses. Furthermore, these devices do not provide simple means for detection of measurement errors and for the correction of measurement readings.

It has also been known to use the tape blade itself for encoding displacement data and to employ various optical readers to read the visible indicia on the tape blade. The use of photosensors to read visible indicia imprinted on the tape also involves problems, such as provision of sufficient light, as well as problems related to mechanical damage to the tape surface or contamination by dirt, grease and the like.

Some of the known electronic measuring devices employing optical techniques have measurement data imprinted on the tape surface in the form of reflective and non-reflective bar-code elements. However, in order to provide the degree of accuracy normally required for such measuring devices, which should be no less than 1/16 of an inch, both the code on the blade and the optical reader have to be high precision components. The code has to be imprinted with a high degree of precision which is not normally found in the manufacturing of conventional tape rules. This, in turn, renders the manufacturing of such measuring devices unjustifiably expensive. Also, most prior art devices use complex optical technology for reading the coded tapes with optical elements of the high resolution type requiring both exacting assembly and precision printing of the coded tape. Therefore, these measuring devices are expensive and difficult to manufacture while using existing tape rule manufacturing methods.

Furthermore, while optical reading of coded tape is a very reliable measuring method for use in a clean environment, it is more likely to be subject to contamination and mechanical surface damage under normal use, for example, on a construction site rendering the device highly unreliable.

SUMMARY OF THE INVENTION

The invention proceeds on the realization that by combining two different measuring means for gathering measurement data, the advantages of both can be utilized in a single measuring device while eliminating many disadvantages and problems encountered in the prior art. The invention includes a rotating take-up reel which is used as a part of a mechanical contact switching means in an electrical circuit to generate electrical pulses corresponding to the blade displacement, as well as an infrared, sensitive indicia imprinted along the blade itself coupled with a photo sensor for reading this marked indicia to determine displacement of the blade.

An object of the present invention is to provide a new and improved measuring apparatus in a form of a tape rule with an electronic detection of the measured distance and a digital display of the same, in which the disadvantages of the prior art devices are substantially eliminated.

It is a further object of this invention to provide a measuring tape which can be both machine and human-readable. It is still another object of the present invention to provide a measuring device which would allow to indicate distance traversed during successive movements of the measuring element in two opposite directions.

It is another object of the instant invention to provide an exceptionally lightweight and compact, hand-held measuring tape of a simple construction, which is inexpensive to manufacture.

It is still another object of the present invention to provide a simple and inexpensive digital electronic measuring tape which has a high degree of accuracy, and excellent reliability and durability. It is also an object of the present invention to provide a measuring tape with simple means for detection and correction of measurement errors.

In the present invention, a digital measuring tape, utilizes a combination of two measuring methods for measuring length which are partially redundant and are used to correct each other.

In particular, the instant measuring device includes an absolute encoder having an infrared bar-code which is imprinted along the tape blade and read by an optical reader for providing absolute measurement displays at selected displacement intervals. In addition, the present invention measuring device includes a simple incremental encoder which is formed of a plurality of ridges located on the take-up reel and switching contacts on a circuit board.

When the tape blade, which is wound on a take-up reel, is withdrawn from the case, the take-up reel rotates as a result of a displacement of the tape blade, and every time one of the ridges on the reel comes into contact with the switch contact on the circuit board, an electric pulse is generated, such that a continuous updated measurement display is provided by the incremental encoder in between the absolute position readings provided by the bar-code.

The absolute encoding including the bar-code on the blade and the optical reader has the advantage of accurately reading the exact tape blade position. However, since the bar-codes are usually rather elaborate, it cannot be read frequently enough by relatively simple optics to allow for example, continuous 1/32nd inch measurement updates. For such frequent displays, it is necessary to resort to complicated bar-codes and high precision optics.

On the other hand, the incremental encoder generating electrical pulses corresponding to the measured length has the advantage of providing small intervals displacement readings due to its simple encoding structure. However, it can be inaccurate due to missed or spurious pulses with no way to snap back to the correct reading.

By combining the results of both encoder's outputs in an integrated circuit, the incremental encoder measurements can be used for 1/32nd inch updates while the absolute encoder can be used to check measurements at longer intervals and correct them if necessary. The combination of the two methods provides the advantages of both and allows elimination of the disadvantages of each method used alone.

In addition to providing pulses for incremental display, the incremental encoder also controls the optical sensor by providing strobed illumination of the tape, such that actual readings of the bar-code are performed only when a pulse is received from the incremental encoder, greatly extending battery life.

On the other hand, the bar-code elements have allocated amounts of pulses for each of the elements of the bar-code being read. Therefore, the count of the pulses by the incremental encoder is also inter-related to the optical reader.

The measuring device of the present invention is designed such that it can be easily incorporated into a standard tape measure housing. It provides simplicity and convenience to the user of standard, hand-held steel measure tapes. At the same time the measuring device of the present invention is highly accurate and reliable when used in environments which usually adversely effect the performance of such known standard measuring devices.

The instant measuring device also provides a convenience of a digital display in addition to visually readable markings on the tape blade. The measuring device of the present invention provides all these advantages at a relatively low manufacturing cost compatible with standard measure tapes presently available on the market.

The electronic components of the instant measuring device can be easily adapted to a standard tape rule housing with little impact on either size or configuration. A case used for conventional mechanical tape blades need only be modified to allow for a liquid crystal display and a battery compartment. The electronics, circuitry and display are mounted on a single circuit board that snaps into the case.

The tape blade used in accordance with the invention is imprinted with an industrial standard Interleaved 2 of 5 bar-code, at the same time that the standard markings for a visual reading are printed, with no higher resolution required. The manufacturing of the measuring device does not require any type of calibration at the time of assembly, and the installation of the tape optical reading head does not require any special settings to compensate for any depth of field as high precision optics would.

The present invention will now be described in more detail with reference being made to one preferred embodiment in conjunction with the accompanying drawings, wherein;

BRIEF DESCRIPTION OF THE DRAWINGS

FIG. 9 shows signal wave forms at various parts of the signal processor unit.

DETAILED DESCRIPTION OF THE PREFERRED EMBODIMENT(S) AND OF THE BEST MODE OF CARRYING OUT THE INVENTION

Figure 1:
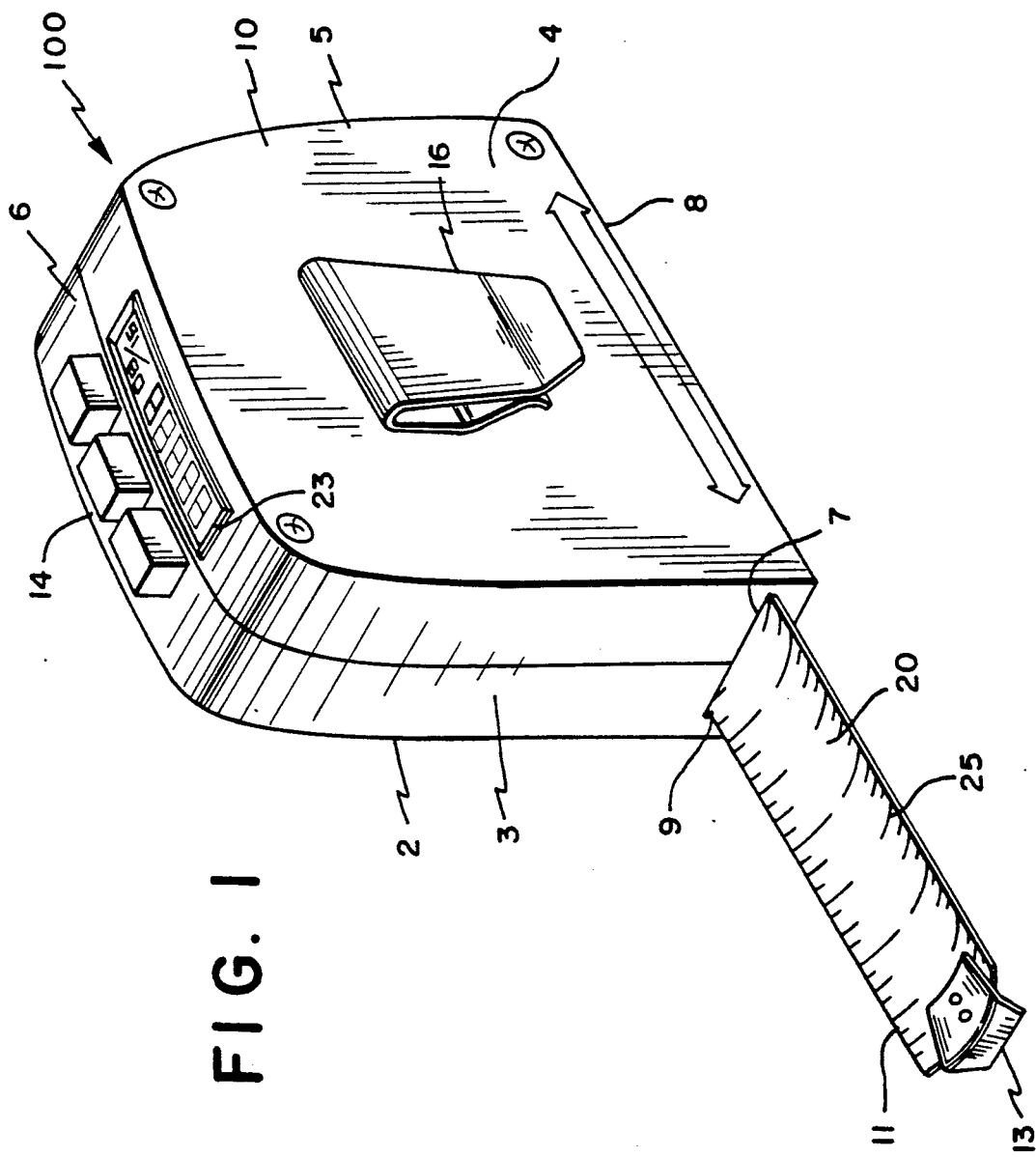
FIG. 1 is a perspective view of a digital measuring tape device according to the present invention.

Referring to the accompanying drawings, FIG. 1 shows one preferred embodiment of a tape measure 100 according to the present invention, which includes an enclosure case 10 having sides 2 and 4, a top 6, a bottom 8, a front end 3 and a rear end 5. The enclosure case 10 is similar in shape and size to conventional, standard hand-held tape measure housings. At the base 7 of the front end 3, a lateral slot 9 is provided through which the extendable tape blade 20 exits from its reeled position in the enclosure case 10. At the end 11 of the tape blade 20, a standard metallic clip 13 is provided to prevent the end 11 of the blade tape from entering the enclosure case 10 and to serve as a finger grasp to facilitate pulling the tape blade 20 from the case 10.

The top 6 of the enclosure case 10 is provided with a plurality of control buttons which are generally designated as 14 and serve various control functions. Different arrangements of the control buttons can of course be made, depending upon the degree of sophistication of a particular product in respect of calculating functions implemented by the device. Next to the control buttons 14, there is a digital LCD display 23 of a known type for displaying measured length. The display 23 is a standard seven segments display with the capacity to read in feet, inches and fractions of inches, to the 32nd of an inch. On the front side of the housing, a holding means 16 is provided in the form of a belt clip, which facilitates carrying the tape measure.

Figure 2:
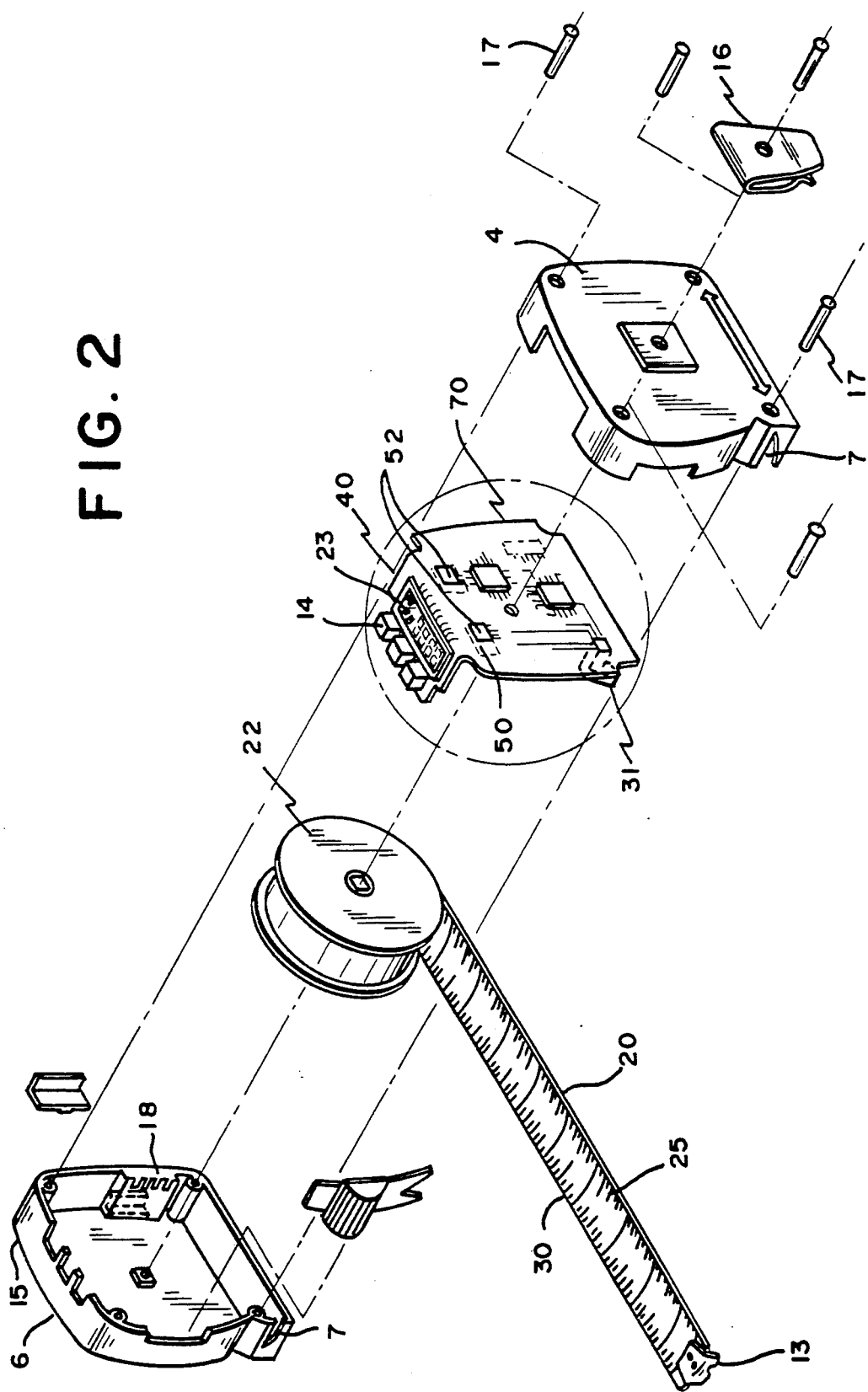
FIG. 2 is a view of the digital measuring device in a disassembled state.

As better shown in FIG. 2, the enclosure case 10 houses therein a standard tape mechanism which includes a measuring tape blade 20 which is wound on a spring recoilable take-up reel 22 with the tape blade 20 extending through the exit slot 9 in the enclosure case 10. The tape blade 20 can be made of steel, or any suitable non-metallic material having sufficient strength and flexibility for printing the visual indicia thereof. The enclosure case 10 is made up of several parts which can be easily disassembled. At least the sides 2 and 4 are removably interconnected with a frame constituting a top, bottom and front and rear sides through a plurality of fastening means 17 as best shown in FIG. 2. Inside the enclosure case 10, a single-piece printed circuit board 40 is inserted which carries the electronic and optical elements and circuitry. The top part of the one-piece printed circuit board 40 includes an LCD display 23 and the control buttons 14, and switch elements 52 constituting part of the incremental encoder 50.

The measuring device is powered by a battery 18 supported in the enclosure case 10.

The digital measuring tape 100 includes two separate means for determining the measured distance. The first means is an incremental encoder 50 which is associated with a take-up reel 22. In the preferred embodiment, the incremental encoder 50 is made up of two parts. The first part is defined by a plurality of ridges 51 which are molded into the take-up reel 22 in two concentric tracks 24, 26, each track provided with ridges 51 which radiate from the center of the take-up reel and are 6° apart, and offset from track to track by 1.5° (see FIGS. 6 and 7A).

As the take-up reel 22 rotates during the withdrawal of the tape blade 20 corresponding to the measured distance, the ridges 51 come into contact with switching elements 52 which are provided on the integrated circuit board 40. Each time the circuit is closed by one of the ridges 51, an electrical pulse is generated and sent to the signal processor 70 where it is used for incremental measurement updates. The ridges 51 are spaced so that an electrical pulse is generated at intervals of every 64th of an inch.

Figure 6:
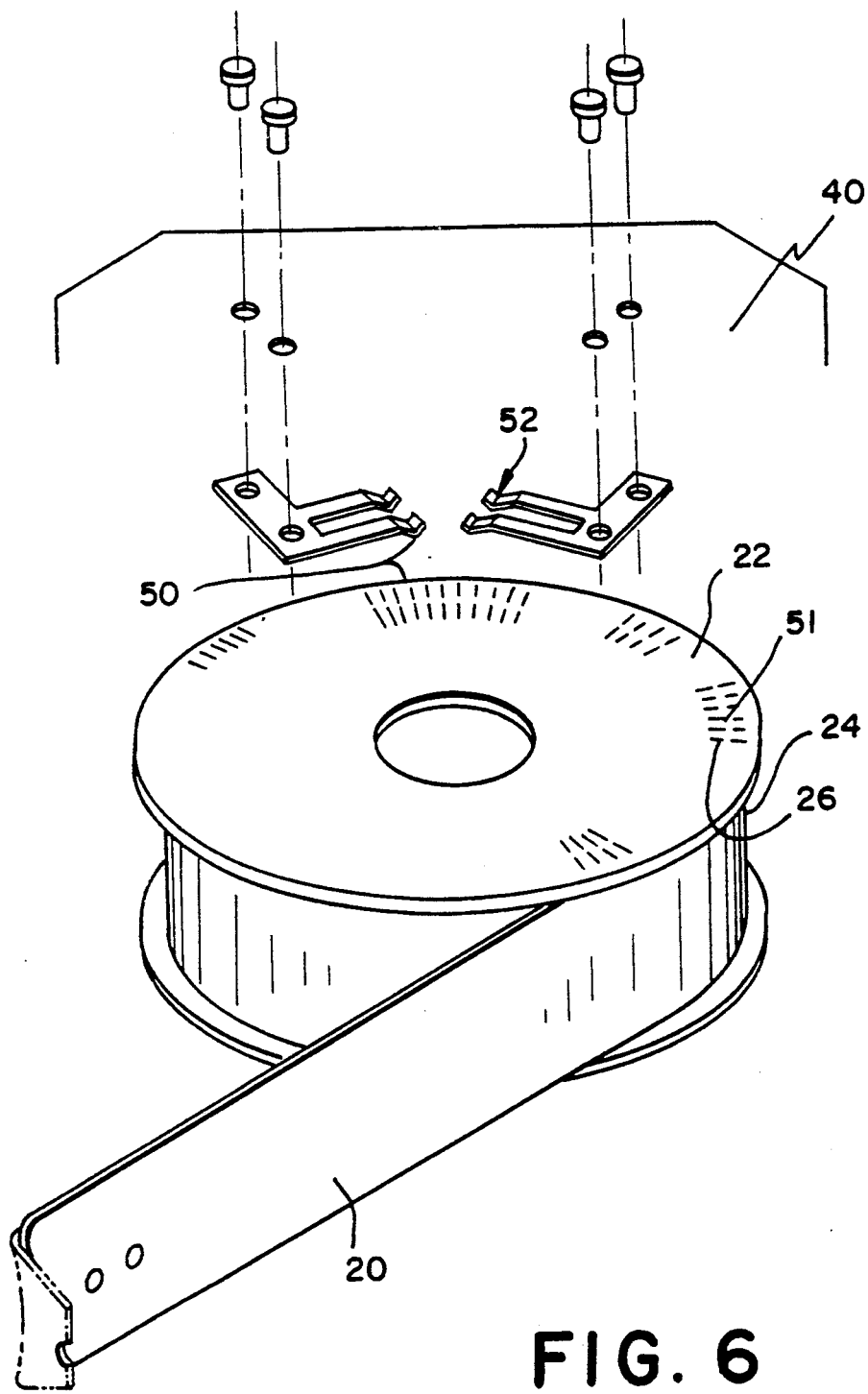
FIG. 6 shows a structure of one preferred embodiment of the incremental encoder.
Figure 7B:
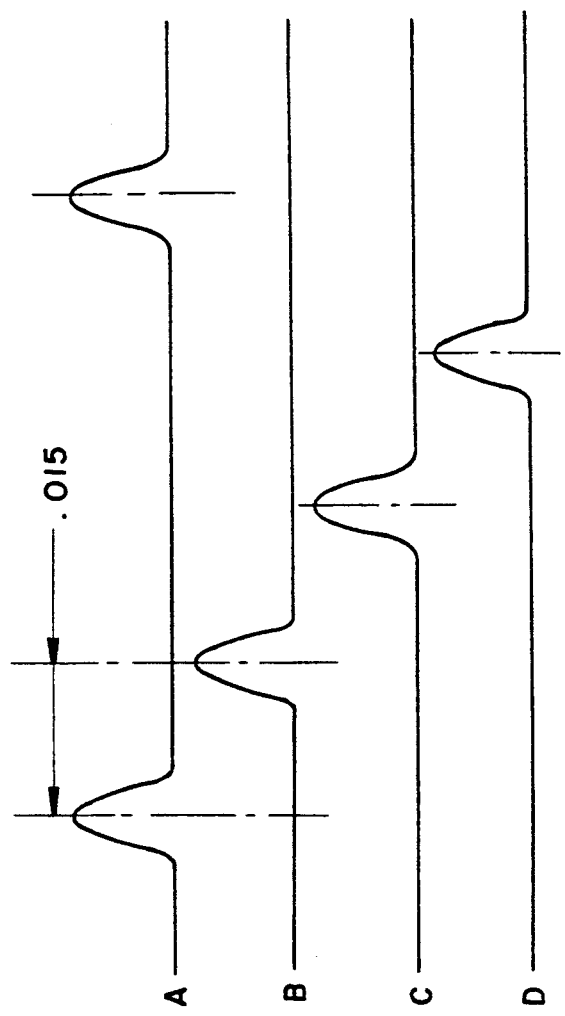
FIGS. 7A and 7B show operation of the incremental encoder.
Figure 7A:
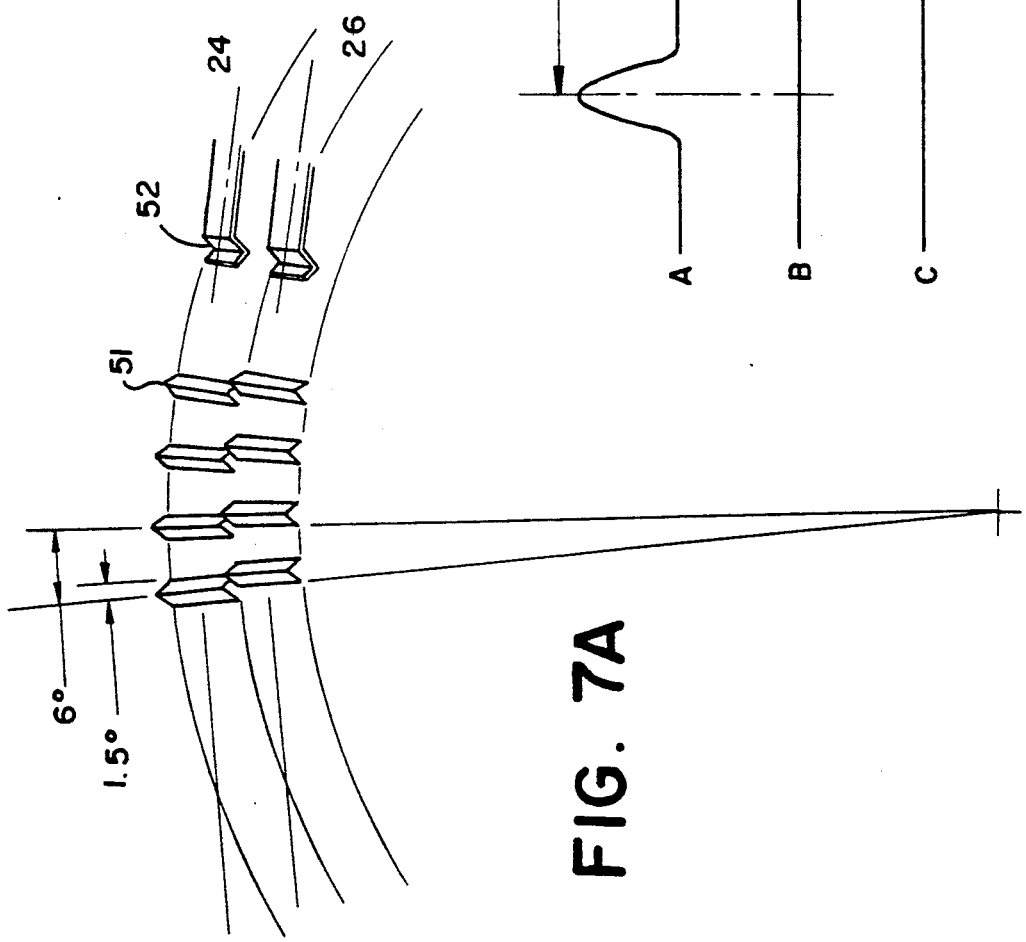

When the signal processor 70 accumulates two pulses from the same direction of motion of the tape blade 20, the display 23 is updated by a 32nd of an inch. As shown in FIG. 6, in the preferred embodiment the incremental encoder 50 is provided with four switching contacts 52 on the circuit board 40, which close as a result of contact with ridges 51 molded into the take-up reel 22.

The use of a plurality of the switches 52 has been chosen to increase the number of pulses corresponding to small displacement intervals, without making the ridges 51 located too close together. This prevents the angles of the ridges 51 from being too steep and allows easy tape direction determination by the signal processor as corresponding to a sequence of received pulses. As the reel rotates, the sequence of the leading and trailing pulse edges indicates to the decoding electronics in the signal processor 70 a direction of motion of the blade. Therefore, the phase and pulse count information can be related to 1/32" increments along the tape blade.

The incremental encoder 50 can of course be of a different structure, such as for example, a plurality of piezoelements provided on the take-up reel for generation of pulses caused upon their deflection by means provided on, for example, the circuit board.

The second measuring means is an absolute encoder 30 which provides measurement updates at, suitably, for example, 3 inch intervals. The absolute encoder 30 includes an IR reflective bar-code 29 imprinted along the complete length of the tape blade 20 and an optical detector assembly 31 for reading the printed code as the blade is being displaced for measurement.

Figure 3:
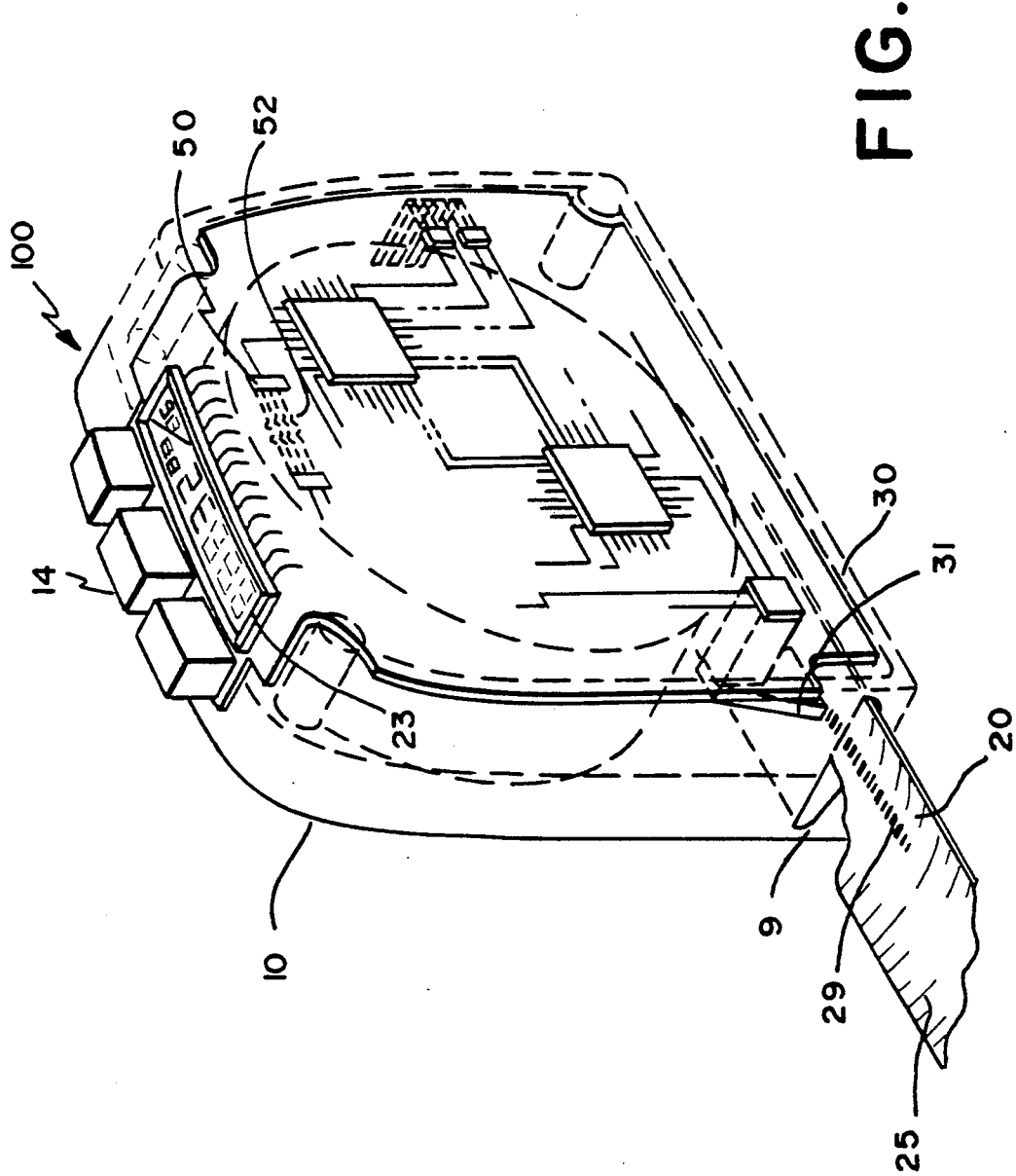
FIG. 3 shows a perspective view of the digital measuring tape according to the present invention partially exploded to show parts mounted within the enclosure case.

As best shown in FIGS. 1–3, the tape blade 20 is also provided with standard, human-readable markings 25 printed along both sides of one surface of the blade.

Figure 4A:
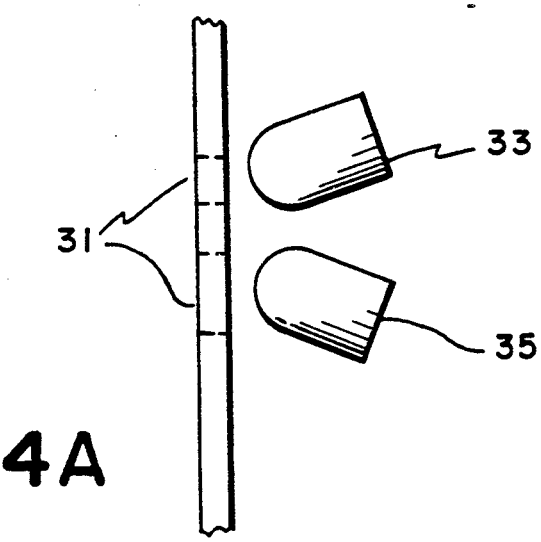
FIGS. 4A and 4B show a schematical structure of the absolute encoder and its operation.
Figure 4B:
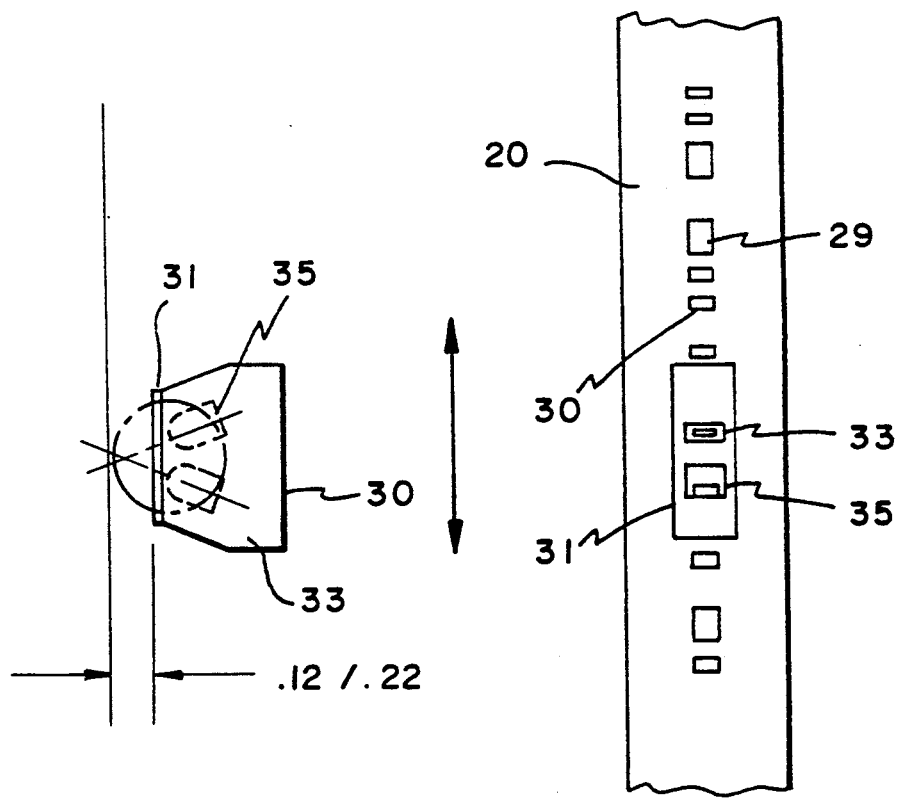
Figures 5A, 5B:
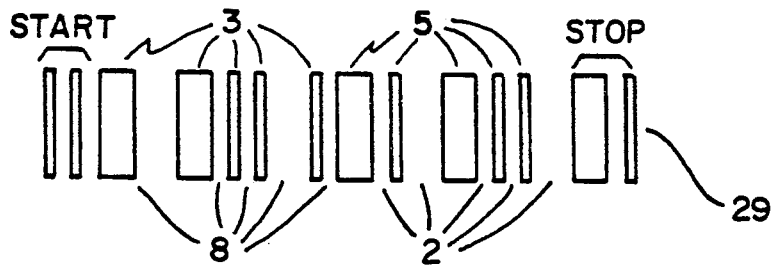
FIGS. 5A and 5B show a preferred embodiment of a bar-code used in the absolute encoder of the present invention device.

The absolute encoder 30, schematically shown in FIGS. 4A and 4B, includes an optical assembly 31 provided inside the enclosure case 10 at the location of the exit slot 9 through which the tape blade 20 is withdrawn from the case 10. For reading the bar-code 29 on the tape blade 20, the optical assembly 31 includes a pair of optical elements 33, 35 which are integrated into a single optical assembly head with an LED emitter 33 for illumination of the blade and a photo detector 35 for receiving light reflected from the tape. Detected light is then converted into an electric signal, such that the movement of the tape is measured by optically detecting the successive code marks along the tape for measuring the length. The known standard bar-code shown in FIGS. 5A and 5B are made of IR reflective and absorbative elements (light and dark) and is therefore not visible on a dark, steel blade which only shows the visible markings 25.

Figure 8:
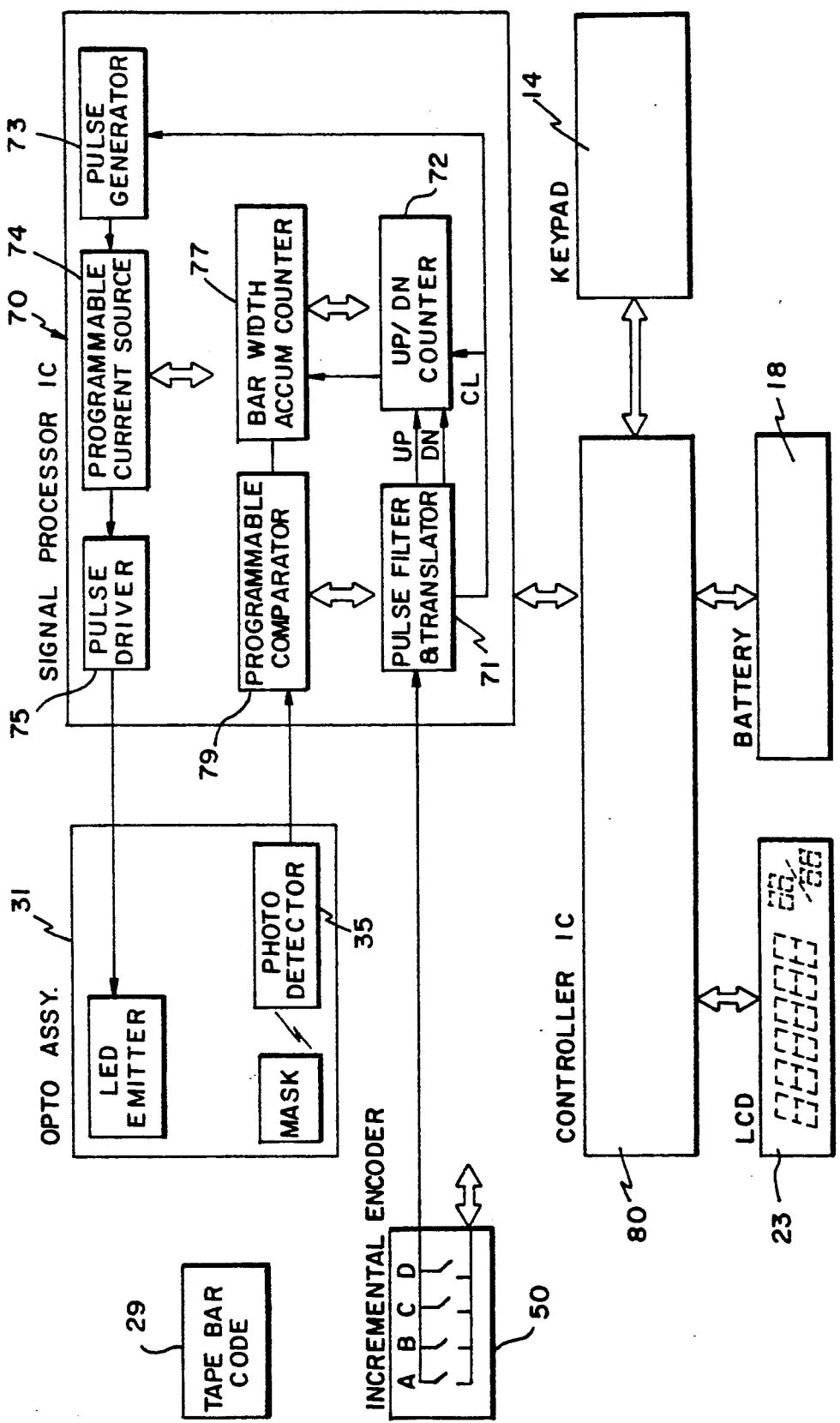
FIG. 8 is a function block diagram showing an operation of the present invention measuring device.

The following is a description of the operation of the present invention measuring device with reference being made to a block diagram shown in FIG. 8 and to FIG. 9.

As the tape blade 20 is withdrawn from its enclosure case 10, electrical signals generated by the incremental encoder 50 are transmitted to the signal processor unit 70. The signal processor unit 70 includes a pulse filter and translator 71 which filters out electrical noise encountered in reading the incremental encoder such as contact bounce, dirt, etc. The pulse filter and translator 71 uses a persistance algorithm that allows the system to accept signals only if they persist for a certain amount of time thereby rejecting spurious signals.

After the analog signal is cleaned up by operation of the filter and translator 71, it is also converted to digital signals which is coupled to the up/down counter 72. Based on these signals which reflect both direction of the blade 20 movement and the extent of incremental movement in units of 1/64 of an inch. The output signal from the pulse filter 71 is also transmitted to the pulse generator 73 on the side of the LED emitter 33. The pulse generator 73 drives the programmable source 74 and pulse driver 75 to actuate the LED emitter 33 for illuminating the bar-code 29 on the blade 20. As a result, the optical detector 35 may look at the bar-code elements on the tape blade 20 every time a pulse is generated by the incremental encoder 50.

The output from the up/down counter 72 is also sent to a bar-width accumulator counter 77 on the detector side of the optical assembly 31. The bar-width accumulator counter 77 responds to the output of the programmable comparator 79 and also to the status of the up/down counter 72.

As shown in FIG. 9, during the bar-code reading, the photo detector generates high amplitude signals corresponding to light elements on the bar segment and low amplitude signals which are below a preset programmable threshold value of the programmable comparator 79. A predetermined count of pulses received by the bar width accumulation counter 77 from counter 72 corresponds to the width of the individual bar-code elements. The change of the state of signals received from the photo detector, from high to low resets the count of pulses received from the up/down counter 72 by the bar width accumulator counter 77. The status (count) of counter 77 is relayed to the controller 80.

For high data density, each bar-code data group i.e. 4 digit redundant coding is separated by a quiet zone, a 2of5 start character and a 2of5 stop character. A valid format consists of a quiet zone recognition, followed by a valid start or stop character, depending on tape direction, followed by a valid character, or characters, each character containing two wide bars and three narrow bars followed by a stop or start character. The code is interleaved in that one character's elements are two wide and three narrow dark elements while the next succeeding character also consists of two wide all three narrow elements, the elements themselves are light elements.

Liberal bar-width discrimination tolerances are necessary so that false readings will not occur due to dirt on the tape blade or normal wear. The incremental encoder output pulse density will be such, that at least a 2-pulse guard band will separate each format bar. For example, the quiet zones (white) could have a width of 13-15 pulses, the wide bars (white or black) could have a width of 8-10 pulses, and the narrow bars (white or black) could have a width of 3-5 pulses.

The number of strobes from the incremental encoder 50 for each bar-code is a maximum of 15 for wide bars and 5 for narrow bars. This ensures that the individual segment of the code will be read. The strobing is caused by the output of the incremental encoder signals, which of course is not continuous. The actual reason for the strobing is to increase the battery life so that the device may be used for several months without replacement.

Inexpensive photo detectors used in the present invention device have inherent weaknesses of varying greatly in quality and have wide variations in sensitivity, not only due to the fact that they are low cost mass produced items, but also because of degradation over time or weak batteries that may cause low output from photo detectors.

In order to obtain a maximum probability of reading bar-code elements correctly, the present invention device uses both programmable current source 74 on the LED emitter side and also a variable-programmable comparator threshold 79 on the detector side are used. The programmable current source 74 is programmed to optimize the current input to the LED such as to control the amount of light illuminating the bar-code 29. The variable-programmable comparator threshold 79 optimizes the output from the detector side so as to see the transition from dark to light segment of the bar-code.

The controller IC 80, connected to the signal processor 70 handles basic chores such as control of the LCD display 23, memory and other functions. The controller receives update signals from the incremental encoder 50 to control measurement display at 1/32 of an inch and from bar width accumulating counter 77 at every 3" intervals, which every time restarts the incremental counter. The controller 80 also controls the programmable current source 74 and the threshold value of the programmable comparator 79. In addition, the controller may also be programmed to turn the system off after a predetermined time if the device is not used, also extending battery life.

The primary method of determining blade displacement in the present invention device, is the incremental encoder and its software. It could, in fact, work alone without updating by the absolute encoder under ideal operating conditions. Each pulse resulting from the operation of switches and ridges and received by the signal processor represents motion in a given direction of the tape blade equal to the distance between a single ridge on the take-up reel and the next ridge on the adjacent track. The signal processor unit also determines the tape blade direction as it receives the pulses by differentiating between the tracks and their sequence.

However, in practice, such incremental encoder would not be error-free and it would be impossible to correct the measurement error once such occurred. In the present invention, the possible errors of the incremental encoder are non-cumulative due to absolute reading performed by the absolute encoder at selected intervals, which in the preferred embodiment, is every 3 inches.

Therefore, after three inches of travel a bar-code will be read, and the signal processor unit will cause the display to the exact blade length. Thereafter, the incremental encoder will begin to update the length measurement at every 32nd of an inch to the next absolute update. Such dual method for gathering and displaying the measurement data allows to achieve high reliability tape reader performance.

It will be understood that variations and modifications may be effected without departing from the spirit and scope of the novel concepts of the present invention.

I claim:

1. A digital linear measuring device comprising:
   a housing;
   a reel located within said housing and a measuring tape wound on said reel, said housing having an opening through which said measuring tape is extendable as said reel is rotated;
   incremental measuring means for generating incremental measuring data as said measuring tape is extended from said housing;
   absolute measuring means for generating absolute measurement data as said measuring tape is extended;
   processing means responsive to both said incremental measurement data and to said absolute measurement data for generating, based on said incremental measurement data and said absolute measurement data, an output reflecting linear extension of said measuring tape from said housing; and
   display means responsive to said processing means for displaying information reflecting said linear extension of said measuring tape from said housing.

2. An apparatus according to claim 1, wherein said processing means combines a last display absolute measurement data with incremental measurement data generated, since that last absolute measurement to generate said output.

3. An apparatus according to claim 1, wherein at least said absolute measuring means cooperates with said measuring tape.

4. A method of measuring length by a digital linear measuring device including a measuring tape wound on a reel located inside a housing, said tape blade being extendable through an opening in the housing as the reel is rotated, said method including the steps of:
   generating incremental measuring data by incremental measuring means as said measuring tape is extended from said housing;
   generating absolute measurement data by absolute measuring means as said measuring tape is extended;
   supplying said incremental and absolute measurement data to processing means responsive to both said incremental measurement data and to said absolute measurement data for generating, based on said incremental measurement data and said absolute measurement data, an output reflecting linear extension of said measuring tape from said housing; and displaying information reflecting said linear extension of said measuring tape from said housing by display means responsive to said processing means.

5. A method according to claim 4, wherein said processing means combines a last displayed absolute measurement data with incremental measurement data generated, since that last absolute measurement to generate said output.

6. A method according to claim 4, wherein at least said absolute measuring means cooperates with said measuring tape.

* * * * *